United States Patent
Oda et al.

(10) Patent No.: US 11,491,758 B2
(45) Date of Patent: Nov. 8, 2022

(54) AGRICULTURAL FLUORINE-RESIN FILM AND GREENHOUSE

(71) Applicant: AGC Inc., Chiyoda-ku (JP)

(72) Inventors: Koichi Oda, Tokyo (JP); Junetsu Nakamura, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/782,177

(22) Filed: Feb. 5, 2020

(65) Prior Publication Data

US 2020/0198287 A1 Jun. 25, 2020

Related U.S. Application Data

(63) Continuation of application No. PCT/JP2018/034051, filed on Sep. 13, 2018.

(30) Foreign Application Priority Data

Sep. 26, 2017 (JP) .............................. JP2017-185017

(51) Int. Cl.
*B32B 3/30* (2006.01)
*A01G 9/14* (2006.01)
(Continued)

(52) U.S. Cl.
CPC ................. *B32B 3/30* (2013.01); *A01G 9/14* (2013.01); *A01G 9/22* (2013.01); *B32B 27/18* (2013.01);
(Continued)

(58) Field of Classification Search
CPC ......... B32B 3/30; B32B 27/18; B32B 27/304; B32B 2307/71; B32B 2410/00;
(Continued)

(56) References Cited

U.S. PATENT DOCUMENTS 4,265,300 A * 5/1981 Kurimoto .............. A01G 9/246
165/47
5,316,825 A * 5/1994 Nakai .................. A01G 9/1438
428/156

(Continued)

FOREIGN PATENT DOCUMENTS

CN 102186333 A 9/2011
JP 59-150816 U 10/1984
(Continued)

OTHER PUBLICATIONS

Translation to English for WO 2018016617A1 via espacenet. accessed Nov. 4, 2020 (Year: 2018).*

(Continued)

*Primary Examiner* — Nancy R Johnson
(74) *Attorney, Agent, or Firm* — Oblon, McClelland, Maier & Neustadt, L.L.P.

(57) ABSTRACT

An agricultural fluorine-resin film and a greenhouse that can increase yield of crops even in high-eave houses are provided. In the agricultural fluorine-resin film containing fluorine-resin, one surface has an uneven surface 1a, a transmittance at a wavelength of from 300 to 800 nm is from 20% to 70%, and a transmittance $T_2$ below is 75% or more. Transmittance $T_2$: Transmittance of a laminate at a wavelength of from 300 to 800 nm, obtained by laminating the resin film and a test film, in which the uneven surface 1a of the resin film is completely filled with water, and the test film which has a thickness of 50 μm, is formed of only an ethylene-tetrafluoroethylene copolymer, and has a transmittance at a wavelength of from 300 to 800 nm of 94% and an arithmetic average roughness Ra of both surfaces of 0.04 μm is laminated on the resin film.

18 Claims, 3 Drawing Sheets

(51) Int. Cl.
  *A01G 9/22* (2006.01)
  *B32B 27/18* (2006.01)
  *B32B 27/30* (2006.01)
  *C08K 5/00* (2006.01)

(52) U.S. Cl.
  CPC ........ *B32B 27/304* (2013.01); *B32B 2307/71* (2013.01); *B32B 2410/00* (2013.01); *C08K 5/005* (2013.01)

(58) Field of Classification Search
  CPC . A01G 9/14; A01G 9/22; A01G 22/05; A01G 9/1407; C08K 5/005; C08J 7/06; Y02A 40/25; Y10T 428/24355; Y10T 428/24372
  See application file for complete search history.

(56) References Cited

U.S. PATENT DOCUMENTS

| | | | |
|---|---|---|---|
| 5,771,630 A * | 6/1998 | Harasawa | ............ A01G 9/1438 47/29.4 |
| 2006/0057343 A1 | 3/2006 | Tsuji et al. | |
| 2011/0220184 A1 * | 9/2011 | Aruga | ............... B32B 17/10018 136/251 |

FOREIGN PATENT DOCUMENTS

| | | | |
|---|---|---|---|
| JP | 60-141753 U | | 9/1985 |
| JP | H0731295 A | * | 2/1995 |
| JP | 2006-115838 A | | 5/2006 |
| JP | 2007-162029 A | | 6/2007 |
| JP | 2010-259406 A | | 11/2010 |
| JP | 2012070707 A | * | 4/2012 |
| JP | 2013-212069 A | | 10/2013 |
| JP | 2016-189728 A | | 11/2016 |
| WO | WO-2018016617 A1 | * | 1/2018 ............. B32B 27/30 |

OTHER PUBLICATIONS

Translation to English for JPH0731295A via espacenet. accessed Nov. 4, 2020 (Year: 1995).*
Translation to English for JP2016189728A via espacenet. accessed Nov. 4, 2020. (Year: 2016).*
Translation to English for JP 2012070707A via espacenet. accessed Nov. 5, 2020. (Year: 2012).*
International Search Report dated Dec. 18, 2018 in PCT/JP2018/034051 filed Sep. 13, 2018 (with English translation), citing documents AP-AU therein, 4 pages.

* cited by examiner

AGRICULTURAL FLUORINE-RESIN FILM AND GREENHOUSE

TECHNICAL FIELD

The present invention relates to an agricultural fluorine-resin film and a greenhouse.

BACKGROUND ART

Resin films having excellent transparency are widely used as a coating material for a greenhouse (hereinafter, sometimes simply referred to as a "house"). The resin film is required to allow a sufficient quantity of light to reach crops in the house. It is also important to prevent leaf burning or bottom rot due to direct sunlight from occurring and growth inhibition of lower leaves that are shaded by upper leaves from occurring.

As an agricultural resin film, for example, an agricultural resin film in which, in a laminate of a base film formed of polyvinyl chloride or the like and a resin layer formed of an acrylic acid ester polymer or the like, a surface of the resin layer has unevenness, is proposed (Patent Literature 1).

CITATION LIST

Patent Literature

[Patent Literature 1] Japanese Unexamined Patent Application, Publication No. 2006-115838

DISCLOSURE OF INVENTION

Technical Problem

In recent years, as greenhouses where tomatoes or cucumbers are grown, the use of houses with high eaves is increasing for the purpose of increasing yield by increasing the height of crops. However, the present inventors found that the yield does not increase much when the agricultural resin film described in Patent Literature 1 is applied to a house with high eaves. The reason for this is considered to be that among diffused transmitted light, a proportion of light going out from a side of the house before reaching the ground is high, and it is difficult for the light to reach crops near the ground.

Particularly in the morning in winter, since sunshine duration is short and sunlight is weak, the quantity of light tends to be insufficient. In order to increase the yield in the house with high eaves, it is important to secure a sufficient quantity of light to reach the crops in the house even in such a time zone. On the other hand, particularly in summer, it is important to prevent leaf burning or bottom rot due to direct sunlight from occurring.

An object of the present invention is to provide an agricultural fluorine-resin film that can increase yield of crops, even in the house with high eaves, during a period when the sunlight is strong on crops or during a period when the sunshine duration is short, and a greenhouse using the agricultural fluorine-resin film.

Solution to Problem

The present invention provides an agricultural fluorine-resin film and a greenhouse having the following configurations [1] to [12].

[1] An agricultural fluorine-resin film containing fluorine-resin, in which one surface has unevenness, a transmittance at a wavelength of from 300 to 800 nm is from 20% to 70%, and a transmittance $T_2$ below is 75% or more.

Transmittance $T_2$: Transmittance of a laminate at a wavelength of from 300 to 800 nm, obtained by laminating the resin film and a test film, in which the surface having the unevenness of the resin film is completely filled with water, and the test film which has a thickness of 50 μm, is formed of only an ethylene-tetrafluoroethylene copolymer, and has a transmittance at a wavelength of from 300 to 800 nm of 94% and an arithmetic average roughness Ra of both surfaces of 0.04 μm is laminated on the resin film.

[2] The agricultural fluorine-resin film according to [1], in which a haze is from 15% to 60%.

[3] The agricultural fluorine-resin film according to [1] or [2], in which the surface having the unevenness has an arithmetic average roughness Ra of from 0.30 to 2.0 μm.

[4] The agricultural fluorine-resin film according to any one of [1] to [3], in which the surface having the unevenness has a maximum height roughness Rz of from 1 to 8 μm.

[5] The agricultural fluorine-resin film according to any one of [1] to [4], in which the fluorine-resin is an ethylene-tetrafluoroethylene copolymer.

[6] The agricultural fluorine-resin film according to any one of [1] to [5], further containing: an ultraviolet absorber.

[7] The agricultural fluorine-resin film according to any one of [1] to [6], in which when light emitted from a light source is incident on the surface opposite the surface having the unevenness in the resin film at an incident angle of 0 degrees, a diffusion angle θ of transmitted light diffused at a light intensity corresponding to 10% of a light intensity of the transmitted light with a diffusion angle of 0 degrees is from 6 to 10 degrees.

[8] The agricultural fluorine-resin film according to any one of [1] to [7], in which when light emitted from light source is incident, a transmittance of parallel rays in transmitted light with a diffusion angle of 2.5 degrees or less is from 15% to 55%.

[9] The agricultural fluorine-resin film according to any one of [1] to [8], in which a thickness is from 25 to 130 μm.

[10] A greenhouse using the agricultural fluorine-resin film according to any one of [1] to [9].

[11] The greenhouse according to [10], in which an eaves height of the house is 4 m or more.

[12] The greenhouse according to [10] or [11], in which the agricultural fluorine-resin film is expanded inside a glass window.

Effects of Invention

When using an agricultural fluorine-resin film of the present invention, it is possible to increase yield of crops, even in the house with high eaves, during a period when the sunlight is strong on crops or during a period when the sunshine duration is short.

In the greenhouse of the present invention, the yield of crops can increase, even with the high eaves, during a period when the sunlight is strong on crops or during a period when the sunshine duration is short.

MODE FOR CARRYING OUT THE INVENTION

The meanings of the following terms in the present specification are as follows.

"Arithmetic average roughness Ra" and "maximum height roughness Rz" mean values measured by a method described in JIS B 0601: 2013 (ISO 4287: 1997, Amd.1: 2009).

"Haze" means a value measured according to JIS K 7136: 2000 (corresponding international standard: ISO 14782: 1999).

"Eave height" of a greenhouse means the height from the ground inside a house to eaves of a house structure.
[Agricultural Fluorine-Resin Film]

An agricultural fluorine-resin film of the present invention (hereinafter also referred to as a "film of the present invention") is a film containing fluorine-resin and having unevenness on one surface. The film of the present invention is applied to a greenhouse so that the surface having the unevenness (hereinafter also referred to as an "uneven surface") faces an inside of the house.

Examples of the fluorine-resin include polyvinylidene fluoride, polytetrafluoroethylene, polychlorotrifluoroethylene, polyhexafluoropropylene, polyvinyl fluoride, a vinylidene fluoride-tetrafluoroethylene-hexafluoropropylene-type copolymer, a vinylidene fluoride-hexafluoropropylene-type copolymer, an ethylene-tetrafluoroethylene-type copolymer (hereinafter also referred to as "ETFE"), a tetrafluoroethylene-hexafluoropropylene-type copolymer, and a perfluoro (alkyl vinyl ether)-tetrafluoroethylene-type copolymer. One kind of the fluorine-resin may be used and two or more kinds thereof may be used.

As the fluorine-resin, from the viewpoint of easily obtaining a film having excellent low-temperature formability and high strength with low costs, the ETFE, the tetrafluoroethylene-hexafluoropropylene-type copolymer, and the perfluoro (alkyl vinyl ether)-tetrafluoroethylene-type copolymer are preferable, and the ETFE is particularly preferable.

A number average molecular weight of the fluorine-resin is preferably from 10,000 to 1,000,000 and particularly preferably from 100,000 to 700,000. If the number average molecular weight of the fluorine-resin is equal to or more than the lower limit of the range, the strength of the film will be higher. If the number average molecular weight of the fluorine-resin is equal to or less than the upper limit of the range, more excellent forming processability is obtained.

The film of the present invention preferably further contains an ultraviolet absorber in addition to the fluorine-resin from the viewpoint of excellent weather resistance. As the ultraviolet absorber, known ones can be used, and examples thereof include inorganic ultraviolet absorbers such as cerium oxide, zinc oxide, and iron oxide, and the like, and commercially available organic ultraviolet absorbers. One kind of the ultraviolet absorbers may be used and two or more kinds thereof may be used.

In a case where the film of the present invention contains the ultraviolet absorber, a content of the ultraviolet absorber with respect to 100 parts by mass of the film of the present invention is preferably from 0.4 to 5 parts by mass, and particularly preferably from 0.5 to 3 parts by mass. If the content of the ultraviolet absorber is equal to or more than the lower limit of the range, excellent weather resistance is obtained. If the content of ultraviolet absorber is equal to or less than the upper limit of the range, a haze will not be too high, and light can be sufficiently taken into the house.

The film of the present invention has a transmittance at a wavelength of from 300 to 800 nm (hereinafter also referred to as a "transmittance $T_1$") of from 20% to 70%, preferably from 30% to 70%, more preferably from 40% to 70%, and particularly preferably from 50% to 70%. If the transmittance $T_1$ is equal to or higher than the lower limit of the range, the transmitted light is not diffused excessively. Therefore, the transmitted light can sufficiently reach near the ground even in a house with high eaves. Therefore, growth is sufficiently promoted even in a portion of the crop near the ground. If the transmittance $T_1$ is equal to or lower than the upper limit of the range, it is possible to prevent leaf burning or bottom rot due to direct sunlight from occurring.

The transmittance $T_1$ can be adjusted, for example, by adjusting the arithmetic average roughness Ra and the maximum height roughness Rz of the uneven surface of the resin film. As Ra and Rz decrease, the transmittance $T_1$ tends to increase.

The film of the present invention has a transmittance $T_2$ of 75% or higher, and preferably 80% or higher. If the transmittance $T_2$ is equal to or higher than the lower limit of the range, light is efficiently taken into the house in a case where the outside air temperature is low and condensation occurs on the uneven surface. Therefore, it is possible to secure a sufficient quantity of light in the house, even in a period such as winter when the sunshine duration is short.

A method of measuring the transmittance $T_1$ and the transmittance $T_2$ is not particularly limited, and it is preferable to use the following measuring apparatus.

A measuring apparatus including a box that blocks external light; a light source provided in the box; a slit plate having a slit that allows a part of the light from the light source to pass through; a toroidal mirror that collects the light that has passed through the slit; an integrating sphere disposed such that the light collected by the toroidal mirror is incident on an entrance window at an incident angle of 0 degrees; and a sample folder disposed on an optical path between the toroidal mirror and the integrating sphere and having an opening through which all of the light collected by the toroidal mirror passes, in which a size of the entrance window is 15 mm long×17.5 mm wide, and in a state where there is nothing other than the sample folder on the optical path, the light that has passed through the slit is collected by the toroidal mirror in a range of width 3 mm×length 12.5 mm in the entrance window.

Figure 1A:
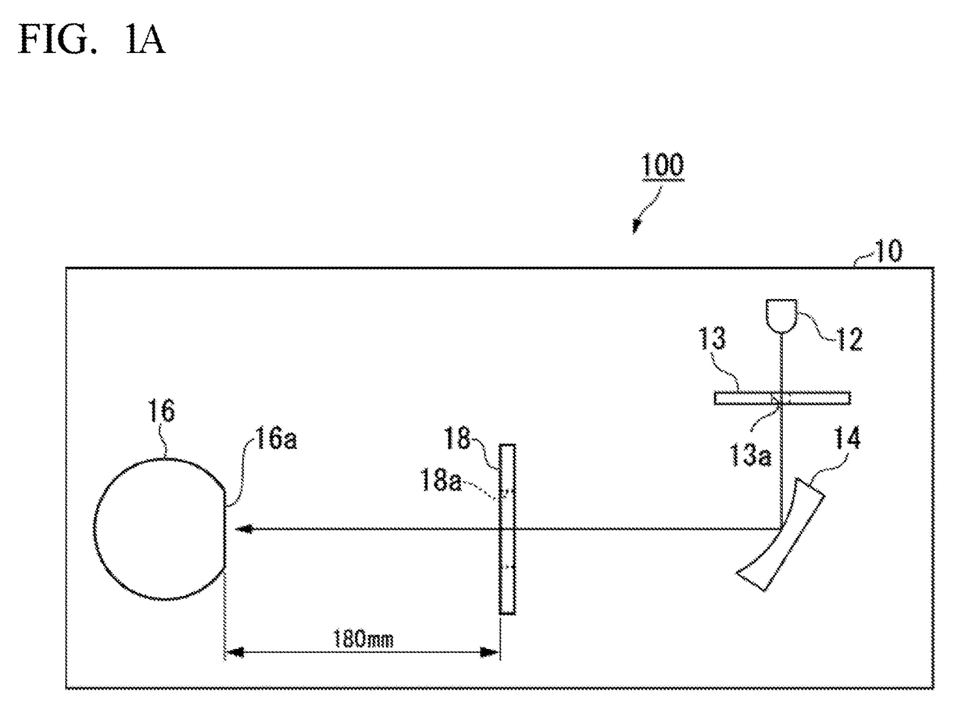
FIGS. 1A and 1B are side views showing a state of measuring a transmittance of a film at a wavelength of from 300 to 800 nm.

For example, a measuring apparatus 100 illustrated in FIG. 1A is used. The measuring apparatus 100 includes a box 10 that blocks external light, a light source 12, a slit plate 13 having a slit 13a, a toroidal mirror 14, an integrating sphere 16 having an entrance window 16a (15 mm long× 17.5 mm wide square), and a sample folder 18 having an opening 18a (10 mm×30 mm square). The light source 12, the slit plate 13, the toroidal mirror 14, the integrating sphere 16, and the sample folder 18 are all disposed in the box 10. The sample folder 18 and the toroidal mirror 14 are disposed in this order on a straight line perpendicular to the entrance window 16a of the integrating sphere 16, with a space therebetween. The light source 12 is disposed on a straight line that intersects perpendicularly a straight line perpendicular to the entrance window 16a of the integrating sphere 16 at a position of the toroidal mirror 14. The slit plate 13 is disposed between the light source 12 and the toroidal mirror 14.

The measuring apparatus 100 is configured such that a part of the light emitted from the light source 12 passes through the slit 13a of the slit plate 13 and is collected by the toroidal mirror 14, and all of the collected light passes through the opening 18a of the sample folder 18 to be incident on the entrance window 16a of the integrating sphere 16 at an incident angle of 0 degrees. The light that has passed through the slit 13a is collected by the toroidal mirror 14 in a range of width 3 mm×length 12.5 mm in the entrance window 16a.

The number of toroidal mirrors is not particularly limited, and a position of the light source may be appropriately set according to a direction and the number of toroidal mirrors. For example, the light emitted from the light source may be sequentially collected by two or more toroidal mirrors provided in the box, and then incident on the entrance window of the integrating sphere at an incident angle of 0 degrees.

The transmittance $T_1$ can be calculated as follows.

Figure 1B:
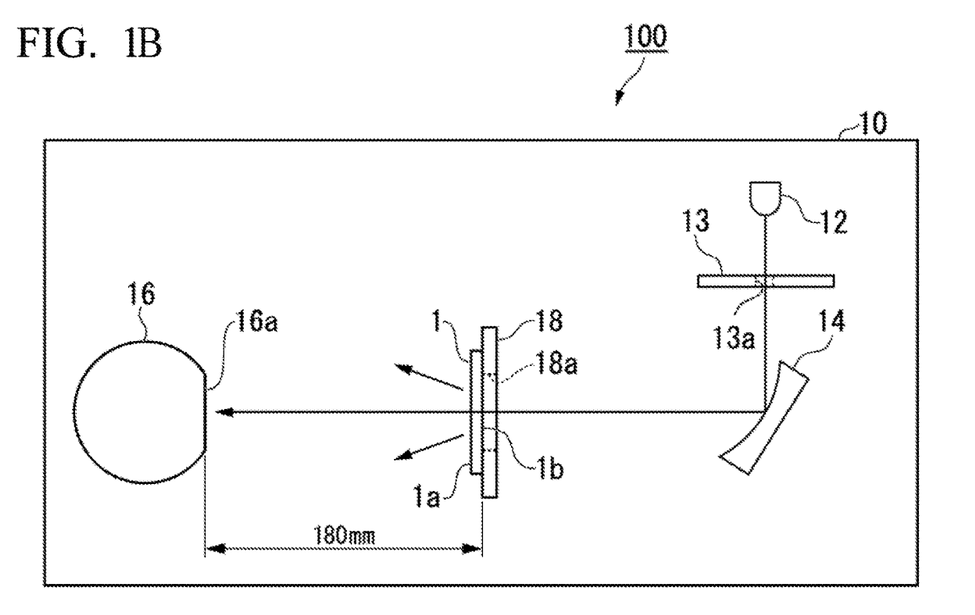

In the measuring apparatus, in a state where a measurement wavelength is from 300 to 800 nm, and there is nothing other than the sample folder on the optical path between the toroidal mirror and the entrance window, of the light emitted from the light source, the quantity of light $Q_{A0}$ of light entering the integrating sphere is measured ("Step a"). Next, the film is attached to the sample folder on the entrance window side so as to cover the opening, and is disposed on the optical path. The uneven surface of the film faces the entrance window side, is parallel to the entrance window. A distance from the entrance window to a surface opposite the uneven surface of the resin film is set to 180 mm. The quantity of light $Q_{A1}$ of light entering the integrating sphere is measured under the same conditions as in Step a, except that the film is disposed ("Step b", FIG. 1B). Next, the transmittance $T_1$ (%) is calculated by Equation 1 below ("Step c").

$$T_1 = Q_{A1}/Q_{A0} \times 100 \qquad \text{Equation 1}$$

The state where there is nothing on the optical path means a state where no members are disposed and there is nothing other than air. In addition, $Q_{A1}$ may be measured before $Q_{A0}$.

The transmittance $T_2$ can be calculated as follows, by using the measuring apparatus described above.

The entire uneven surface of the film is completely filled with water. Next, a test film which has a thickness of 50 μm, is formed of only an ETFE, and has a transmittance at a wavelength of from 300 to 800 nm of 94% and an arithmetic average roughness Ra of both surfaces of 0.04 μm is laminated on the film on an uneven surface side to obtain a laminate ("Step d"). Next, the laminate is attached to the sample folder on the entrance window side so as to cover the opening, and is disposed on the optical path. The uneven surface of the laminate faces the entrance window side, is parallel to the entrance window. A distance from entrance window to a surface opposite the uneven surface of the film is set to 180 mm. The quantity of light $Q_{A2}$ of light entering the integrating sphere is measured under the same conditions as in Step a, except that the laminate is disposed ("Step e")). Next, the transmittance $T_2$ (%) is calculated by Equation 2 below ("Step f").

$$T_2 = Q_{A2}/Q_{A0} \times 100 \qquad \text{Equation 2}$$

Figure 2:
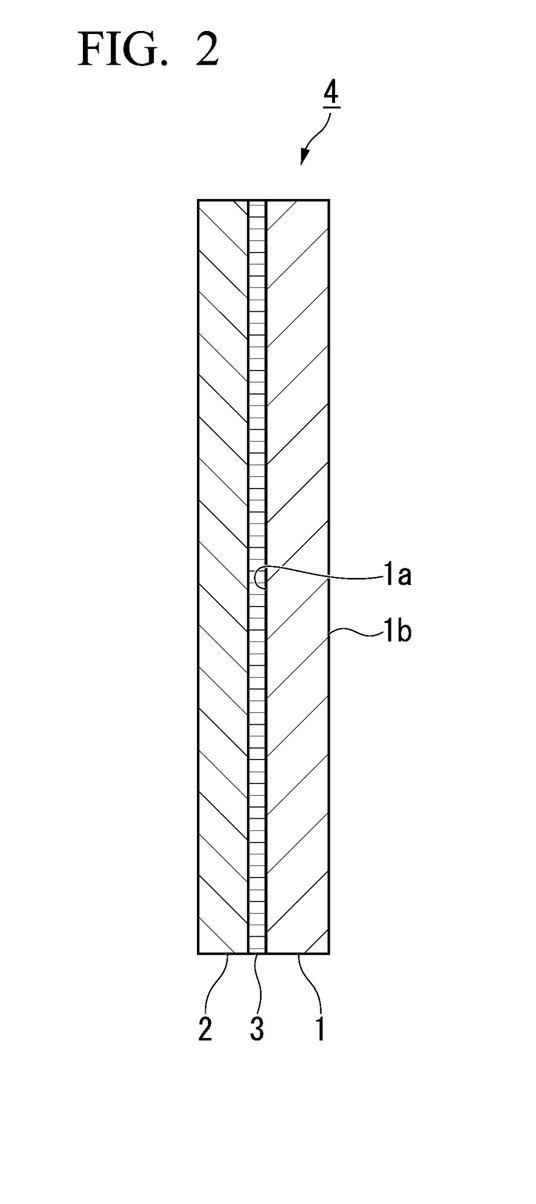
FIG. 2 is a sectional view showing a laminate used for measuring a transmittance $T_2$.

In Step d, as shown in FIG. 2, after water is applied to the entire uneven surface 1a of the agricultural fluorine-resin film 1 (hereinafter also referred to as a "film 1"), the test film 2 is stacked on the film 1 on the uneven surface 1a side to form a laminate 4 in which a water film 3 is formed between the film 1 and the test film 2. In the measurement of transmittance $T_2$, such a laminate is used instead of a single film. In the laminate, a water film is formed between the film of the present invention and the test film. In the measurement of transmittance $T_2$, it is assumed a state where the water film is formed by condensation on a surface having the unevenness of the film of the present invention.

(Haze)

The film of the present invention has a haze of preferably from 15% to 60%, more preferably from 15% to 50%, and particularly preferably from 15% to 40%. If the haze is equal to or higher than the lower limit of the range, scattered light at a growth point can be obtained. If the haze is equal to or lower than the upper limit of the range, the transmitted light can sufficiently reach near the ground even in a house with high eaves.

<Surface Roughness>

In the film of the present invention, the arithmetic average roughness Ra of the uneven surface is preferably from 0.30 to 2.0 μm, more preferably from 0.8 to 1.8 μm, and particularly preferably from 1.0 to 1.6 μm. If the Ra of the uneven surface is equal to or more than the lower limit of the range, it is easy to prevent leaf burning or bottom rot due to direct sunlight from occurring. If the Ra of the uneven surface is equal to or less than the upper limit of the range, the transmitted light can sufficiently reach near the ground even in a house with high eaves.

In the film of the present invention, the maximum height roughness Rz of the uneven surface is preferably from 1 to 8 μm, more preferably from 4 to 7 μm, and particularly preferably from 4 to 6 μm. If the Rz of the uneven surface is equal to or more than the lower limit of the range, it is easy to prevent leaf burning or bottom rot due to direct sunlight from occurring. If the Rz of the uneven surface is equal to or lower than the upper limit of the range, the transmitted light can sufficiently reach near the ground even in a house with high eaves.

(Diffusion Angle θ)

In the film of the present invention, when light emitted from the light source is incident on the surface opposite the uneven surface in the resin film at an incident angle of 0 degrees, a diffusion angle θ of the transmitted light diffused at a light intensity corresponding to 10% of a light intensity of the transmitted light with a diffusion angle of 0 degrees is preferably from 6 to 10 degrees. The transmitted light with a diffusion angle in the range of from 0 to 0 degrees is light having a light intensity of 10% or more with respect to the light intensity of the transmitted light with a diffusion angle of 0 degrees. It means that the smaller the diffusion angle θ, the smaller the degree of diffusion of the transmitted light, and the larger the diffusion angle θ, the greater the degree of diffusion of the transmitted light. If the diffusion angle θ is within the range, the transmitted light can sufficiently reach near the ground while preventing leaf burning or bottom rot due to direct sunlight from occurring, even in a house with high eaves. Therefore, the growth of the crops is sufficiently promoted, and the yield is further increased. The diffusion angle θ is particularly preferably from 6 to 8 degrees.

Figure 3A:
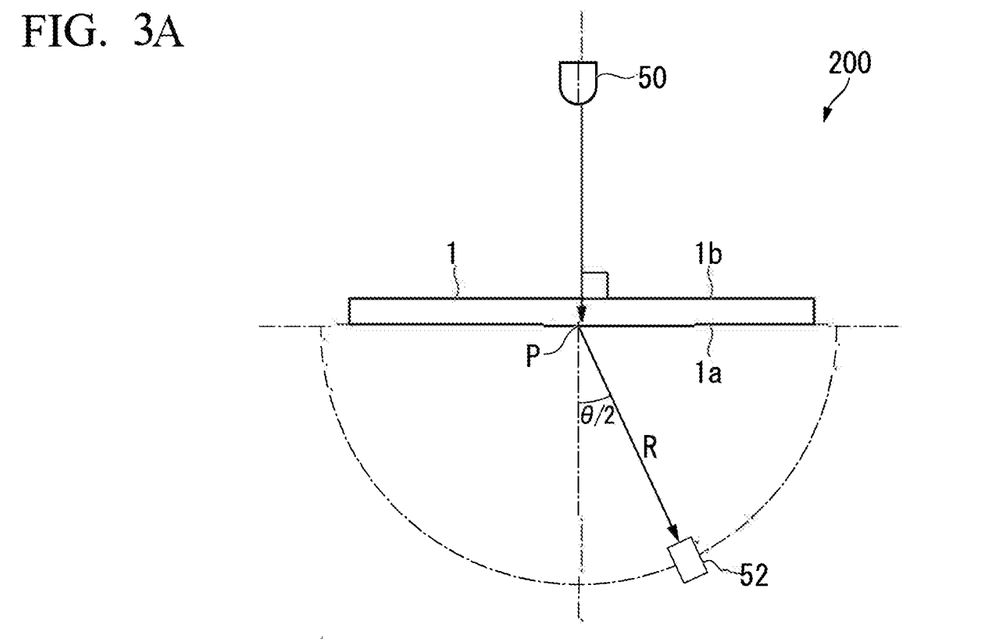
FIG. 3A is a side view showing a state of measuring a diffusion angle θ of transmitted light diffused at a light intensity corresponding to 10% of a light intensity of the transmitted light with a diffusion angle of 0 degrees.

The diffusion angle θ is measured using a measuring apparatus 200 illustrated in FIG. 3A. A measuring apparatus 200 includes a light source 50 and a light receiver 52 provided below the light source 50, and is configured so that the film 1 can be provided between the light source 50 and the light receiver 52. The film 1 is provided so that the uneven surface 1a faces the light receiver 52 side and the surface 1b opposite the uneven surface 1a faces the light source 50 side. The measuring apparatus 200 is configured such that the light receiver 52 moves on a circumference of a radius R from a point P in the uneven surface 1a of the film 1, where the light incident on the surface 1b from the light source 50 reaches at an incident angle of 0 degrees, and light intensity of the transmitted light with a diffusion angle in a range of from −85 to 85 degrees can be measured.

Figure 3B:
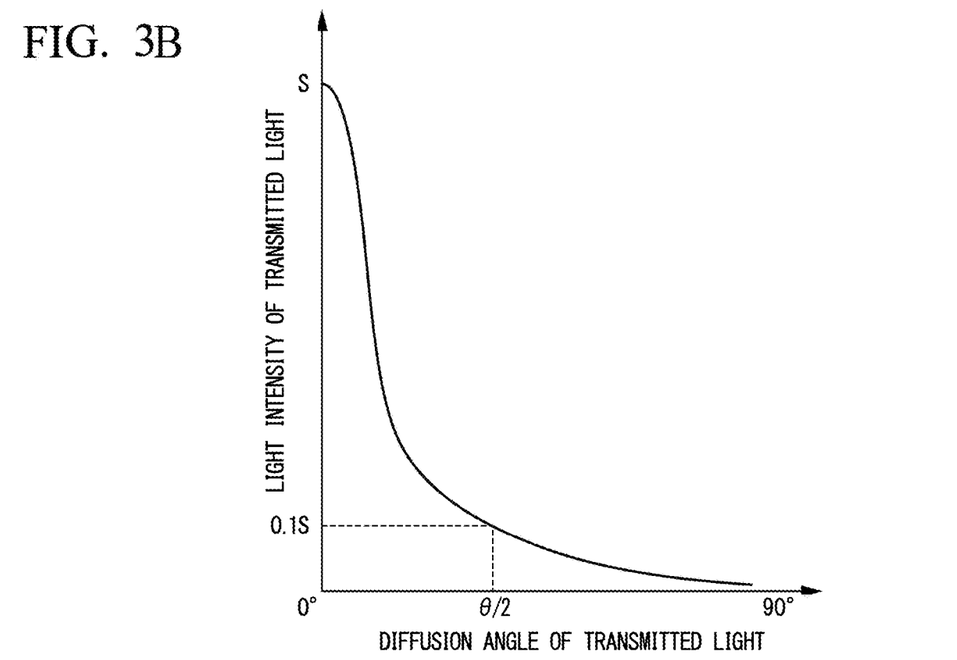
FIG. 3B is a graph showing a relationship between the diffusion angle of the transmitted light and the light intensity of the transmitted light.

As shown in FIG. 3B, the light intensity of the transmitted light with a diffusion angle in the range of from −85 to 85 degrees is maximized when the diffusion angle of the transmitted light is 0 degrees. When the light intensity of the transmitted light when the diffusion angle is 0 degrees is S, the diffusion angle corresponding to 0.1 S is determined as the diffusion angle θ. In the measuring apparatus 200, the light intensity of the transmitted light with a diffusion angle in a range of from 0 to −85 degrees is symmetric with the light intensity of the transmitted light with a diffusion angle in a range of from 0 to 85 degrees.

(Transmittance of Parallel Rays of Transmitted Light with Diffusion Angle of 2.5 Degrees or Less)

In the film of the present invention, when the light emitted from the light source is incident, a transmittance of parallel rays of the transmitted light with a diffusion angle of 2.5 degrees or smaller (hereinafter also referred to as "narrow angle scattering") is preferably from 15% to 55% and particularly preferably from 20% to 55%. When the transmittance of parallel rays is within the range, light obliquely incident on the film can be easily taken into the house, and the yield of crops is further increased.

(Film Thickness)

A thickness of the film of the present invention is preferably from 25 to 130 μm and particularly preferably from 50 to 100 μm. If the thickness of the resin film is equal to or larger than the lower limit of the range, sufficient strength is easily obtained. If the thickness of the resin film is equal to or smaller than the upper limit of the range, the transparency is excellent and handling during construction is excellent.

The film of the present invention may be a film in which an uneven surface is coated with an anti dropping agent. The anti dropping agent is not particularly limited, and known material can be used. Examples thereof include inorganic fine particles such as silica fine particles or alumina fine particles.

In a case where the uneven surface is coated with the anti dropping agent, the film before being coated may be subjected to a surface treatment for enhancing the coating property of the anti dropping agent. The surface treatment is not particularly limited, and examples thereof include plasma treatment, ozone treatment, flame treatment, chemical conversion treatment, and primer treatment. In addition, for example, primer treatment may be further conducted after the plasma treatment. Examples of the primer treatment include coating with a silane coupling agent. Further, the uneven surface of the film may be coated with an anti dropping agent containing a silane coupling agent as a main component and containing inorganic fine particles such as silica fine particles or alumina fine particles.

<Operational Effect>

Since the film of the present invention described above has a transmittance $T_1$ of from 20% to 70%, even in a case where the film is applied to a house with high eaves, the light sufficiently reaches near the ground, while reducing the direct exposure of sunlight to crops. In addition, since the transmittance $T_2$ is 75% or higher, even when condensation occurs on the uneven surface, light can be efficiently taken into the house in a state where a water film is formed. Therefore, a sufficient quantity of light reaching the crops in the house can be ensured even in a time zone when the sunshine duration is short and the quantity of light tends to be insufficient, such as in the morning in winter.

In addition, the film of the present invention contains fluorine-resin, and thus has excellent moisture permeability. Therefore, it is possible to efficiently release condensed water and air containing moisture in the house to the outside of the house. For this reason, when the temperature in the house rises, it is possible to prevent the humidity from increasing excessively and to prevent the crops from suffering from diseases such as canker disease. In addition, the film of the present invention contains fluorine-resin, and thus has excellent weather resistance. Therefore, it is possible to maintain the efficiency of taking light into the house and excellent moisture permeability for a long time.

From the above, when using the film of the present invention, it is possible to increase yield of crops, even in the house with high eaves, during a period when the sunlight is strong on crops or during a period when the sunshine duration is short.

[Greenhouse]

A greenhouse of the present invention is particularly effective as a greenhouse having a high eaves height of 4 m or more. Even if the eaves are high, the light sufficiently reaches near the ground while reducing the direct exposure of sunlight to crops. An inside of the house can be prevented from becoming hot and humid, and a sufficient quantity of light can be ensured even during a period when the sunshine duration is short.

Examples of the greenhouse of the present invention can include an agricultural glass house in which the film of the present invention is expanded all over the inside of the glass window, in addition to an agricultural plastic greenhouse in which the film of the present invention is expanded all over the house. In the agricultural glass house, moisture-containing air in the house passes through the film, and then goes out of the house through the gap between the glass window and a frame portion. Therefore, also in the agricultural glass house, it is possible to prevent the inside of a house becoming hot and humid.

EXAMPLES

Hereinafter, the present invention will be described in detail using examples, but the present invention is not limited by the following description. Among Examples 1 to 13 and 21 to 24, Examples 1 to 4 and 21 are examples, and Examples 5 to 13 and 22 to 24 are comparative examples.

(Evaluation Method)

(Arithmetic Average Roughness Ra and Maximum Height Roughness Rz)

For the film of each example, the arithmetic average roughness Ra and the maximum height roughness Rz of the coated surface were measured using a surface roughness measuring instrument (product name "480A", manufactured by Tokyo Seimitsu Co., Ltd.).

(Haze)

For the film of each example, haze (DRY) was measured using a haze meter (product name "NDH5000", manufactured by Nippon Denshoku Industries Co., Ltd.). In addition, a test film having a thickness of 50 μm (product name "F-CLEAN", manufactured by AGC Green-Tech Co., Ltd.) is laminated on the film on the coated surface side where water has been applied to the entire coated surface to obtain a laminate in which a water film was formed between the resin film and the test film, and the haze (WET) of the laminate was measured.

Light source: D65 light source using white LED (Transmittances $T_1$ and $T_2$)

The transmittances $T_1$ and $T_2$ of the film of each example were measured as follows.

As a box that blocks external light, a large sample chamber (product name "MPC-3100", manufactured by Shimadzu Corporation) was used. In addition, the following spectrophotometer was provided inside the box to configure a measuring apparatus equivalent to the measuring apparatus 100 shown in FIGS. 1A and 1B. In the spectrophotometer, a part of the light emitted from the light source passes through the slit, and is collected by the toroidal mirror in the range of 3 mm width z 12.5 mm length in the entrance window of the integrating sphere to be incident on the entrance window with an incident angle of 0 degrees.

<Spectrophotometer>

Product name: "UV-3600" (manufactured by Shimadzu Corporation)

Entrance window: 15 mm long×17.5 mm wide square

Distance from entrance window to toroidal mirror: 350 mm

Distance from entrance window to sample folder: 180 mm

Opening of sample folder: 10 mm×30 mm square

Slit condition: Slit wavelength 8 nm

Light source: Deuterium discharge tube lamp (from 190 nm to 450 nm) and tungsten halogen lamp (from 350 nm to 2300 nm)

In the measuring apparatus, in a state where there is nothing other than the sample folder on the optical path between the toroidal mirror and the entrance window, of the light emitted from the light source, the quantity of light $Q_{A0}$ of light entering the integrating sphere from the entrance window was measured by using a measurement wavelength of from 300 to 800 nm. Next, a film was attached to the sample folder on the integrating sphere side so as to cover the opening. The attachment of the film was performed such that the surface coated with the anti dropping agent (hereinafter also referred to as a "coated surface") faces the entrance window side and is parallel with the entrance window, and the distance from the entrance window to the surface opposite the coated surface in the film became 180 mm. Except that the film was disposed, the quantity of light $Q_{A1}$ of the light entering the integrating sphere from the entrance window was measured under the same conditions as the measurement of the quantity of light $Q_{A0}$, and the transmittance $T_1$ (%) was calculated by Equation 1 below.

$$T_1 = Q_{A1}/Q_{A0} \times 100 \qquad \text{Equation 1}$$

After water was applied to the entire coated surface of the film, a test film (product name "F-CLEAN", manufactured by AGC Green-Tech Co., Ltd., thickness: 50 μm, total light transmittance at a wavelength of from 300 to 800 nm: 94%, a film formed of only ETFE having arithmetic average roughness Ra of the surface: 0.04 μm) is laminated on the film on the coated surface side to obtain a laminate in which a water film was formed between the film and the test film. In the measuring apparatus, the laminate was attached to the sample folder on the integrating sphere side so as to cover the opening. The attachment of the laminate was performed such that the coated surface in the film of the laminate faces the entrance window side and is parallel with the entrance window, and the distance from the entrance window to the surface opposite the coated surface in the film became 180 mm. Except that the laminate was disposed, the quantity of light $Q_{A2}$ of the light entering the integrating sphere from the entrance window was measured under the same conditions as the measurement of the quantity of light $Q_{A0}$, and the transmittance $T_2$ (%) was calculated by Equation 2 below.

$$T_2 = Q_{A2}/Q_{A0} \times 100 \qquad \text{Equation 2}$$

(Diffusion Angle θ)

As the measuring apparatus 200 shown in FIGS. 3A and 3B, a goniophotometer (product name "GC-5000L", manufactured by Nippon Denshoku Industries Co., Ltd.) is used, and the film was provided such that the coated surface faces the light receiver side and the surface opposite the coated surface faces the light source side. In the goniophotometer, light is incident on the surface opposite the coated surface in the film from the light source at an incident angle of 0 degrees, and the light intensity of the transmitted light in a range where half of the diffusion angle θ is from 0 to 90 degrees was measured. When the light intensity of the transmitted light with a diffusion angle of 0 degrees was 100%, the diffusion angle θ of the transmitted light diffused at the light intensity corresponding to 10% was determined. (Angle to be measured is θ/2) Light source: D65 light source using tungsten halogen lamp (Narrow Angle Scattering)

For the film of each example, narrow angle scattering was measured using a haze gard i (manufactured by Tetsutani & Co., Ltd.).

Light source: D65 light source using white LED

[Surface Embossed Back Roll Used in Each Example]

Roll A: Roll with Ra of 2.6 μm and Rz of 19.5 μm

Roll B: Roll with Ra of 0.35 μm and Rz of 2.4 μm

Example 1

ETFE (product name "Fluon ETFE C-88AX", manufactured by AGC Inc.) was used as the fluorine-resin, and a resin film having unevenness on one surface was produced by a T-die extrusion method in which resin extruded into a film shape allowed to pass between a pair of metal rolls and a surface embossed back roll of the kind shown in Table 1 while rotating the rolls. "Unused" in Table 1 means that a back roll having no embossed surface was used instead of the surface embossed back roll. The forming conditions were as follows: a die temperature was 310° C., a temperature of the metal roll was 50° C., a temperature of surface embossed back roll was 50° C., an air gap between rolls was 150 mm, and the take-up speed was as shown in Table 1. The uneven surface of the resin film was subjected to corona discharge treatment, and then coated with an anti dropping agent (product name "F-CLEAN anti dropping agent", manufactured by AGC Green-Tech Co., Ltd.) by the gravure coating method, and dried at 70° C. for 30 seconds to form a layer having a thickness of 0.3 μm, and a film with an anti dropping agent was obtained.

Example 2

The uneven surface of the resin film obtained in the same manner as in Example 1 was subjected to corona discharge treatment, and then coated with an undercoat solution below by the gravure coating method, and then dried at 80° C. for 5 seconds to form an undercoat layer with a coating amount of 0.03 g/m². Next, a film with an anti dropping agent was obtained in the same manner as in Example 1 except that coating with the following anti dropping agent was performed by a gravure coating method.

Undercoat solution: Solution obtained by mixing 1 part by mass of aminosilane (product name "KBM903", manufactured by Shin-Etsu Chemical Co., Ltd.), 0.05 parts by mass of a leveling agent (product name "Sunphenol 420", manufactured by Shin-Etsu Chemical Co., Ltd.), and 98.95 parts by mass of industrial ethanol (product name "Sol Mix AP-1" manufactured by Nippon Alcohol Sales Co., Ltd.)

Anti dropping agent: Solution obtained by mixing solutions 1 and 2 below

Solution 1: 1.5 parts by mass of 1 N nitric acid was added to 16.1 parts by mass of ion-exchanged water, and 9.7 parts by mass of silica sol (product name "Snowtex S", manufactured by Nissan Chemical Industries, pH 10, solid content concentration: 30% by mass) was added thereto while stirring. The stirring was continued for 30 minutes, and the mixture was allowed to stand at room temperature (25° C.) for 1 day. Solution 2: 2 parts by mass of 1 N nitric acid to 2.75 parts by mass of ion-exchanged water, and 50 parts by mass of industrial ethanol (product name "SOLMIX AP-1", manufactured by Nippon Alcohol Sales Co., Ltd.), 17.8 parts by mass of boehmite (product name "K-Statch Z20A", manufactured by K-I Chemical Industry Co., LTD, pH 4.0, solid content concentration: 20% by mass), and 0.2 parts by mass of aminosilane (product name "KBM 903", manufactured by Shin-Etsu Chemical Co., Ltd.) were added thereto while stirring. The stirring was continued for 30 minutes, and then the mixture allowed to stand at room temperature (25° C.) for 1 day.

Examples 3 to 5

Except that the surface embossed back roll was changed as shown in Table 1 and the take-up speed was changed as shown in Table 1, a resin film having unevenness on one side was produced in the same manner as in Example 1. The uneven surface of the resin film was subjected to a corona discharge treatment and then coated with an anti dropping agent, in the same manner as in Example 1, to obtain a film with an anti dropping agent.

Example 6

Except that the take-up speed was changed as shown in Table 1 and extrusion forming was performed using only a metal roll on one side without using the surface embossed back roll, a resin film was produced in the same manner as in Example 1. In the resin film, Ra and Rz were measured on the surface not in contact with the metal roll. The surface of the resin film where Ra and Rz were measured was subjected to a corona discharge treatment and then coated with an anti dropping agent, in the same manner as in Example 1, to obtain a film with an anti dropping agent.

Examples 7 to 13

For the resin film, product name "Super Kirinashi" manufactured by Sekisui Film Co., Ltd. (Example 7), product name "hanayaka (registered trademark)" manufactured by Sekisui Film Co., Ltd. (Example 8), product name "scattered light farming vinyl SUNRUN (registered trademark)" manufactured by Mitsubishi Plastics Agri Dream Co., Ltd. (Example 9), product name "BI SANRAN E-STAR (registered trademark)" manufactured by Mitsubishi Plastics Agri Dream Co., Ltd. (Example 10), product name "BI SANRAN DIASTAR (registered trademark)" manufactured by Mitsubishi Plastics Agri Dream Co., Ltd. (Example 11), product name "Kagenashi 5" manufactured by C.I. TAKIRON Corporation (Example 12), and product name "Cleantate (registered trademark) SK" manufactured by Santerra (Example 13) were prepared.

The uneven surfaces of the "Super Kirinashi" (Example 7) and "hanayaka (registered trademark)" (Example 8) were subjected to a corona discharge treatment and then coated with an anti dropping agent, in the same manner as in Example 1, to obtain a film with an anti dropping agent. In addition, the surfaces of the "scattered light farming vinyl SUNRUN (registered trademark)" (Example 9), "BI SANRAN E-STAR (registered trademark)" (Example 10), "BI SANRAN DIASTAR (registered trademark)" (Example 11), "Kagenashi 5" (Example 12), and "Cleantate (registered trademark) SK" (Example 13) where the arithmetic average roughness Ra and the maximum height roughness Rz were measured were also subjected to a corona discharge treatment and then coated with an anti dropping agent, in the same manner as in Example 1, to obtain a film with an anti dropping agent.

Table 1 shows kinds and use or not of surface embossed back roll, and measurement results of take-up speed, a thickness of the resin film, the arithmetic average roughness Ra, the maximum height roughness Rz, the haze, the transmittances $T_1$ and $T_2$, the narrow angle scattering, and a scattering angle θ of each example. The diffusion angle θ of "0 degrees" means that the transmitted light was not diffused at all.

TABLE 1

| Example | Use or not of surface embossed back roll (Roll A or B) | Take-up speed (m/min) | Thickness of resin film [μm] | Surface roughness Ra [μm] | Surface roughness Rz [μm] | Haze (DRY) [%] | Haze (WET) [%] | Transmittance $T_1$ [%] | Transmittance $T_2$ (%) | Diffusion angle θ/2 (°) | Narrow angle scattering [%] |
|---|---|---|---|---|---|---|---|---|---|---|---|
| 1 | Use roll A | 6 | 80 | 1.26 | 5.71 | 24.5 | 9.0 | 61.7 | 83.4 | 3 | 37.5 |
| 2 | Use roll A | 6 | 80 | 1.26 | 5.71 | 24.5 | 9.0 | 61.7 | 83.4 | 3 | 37.5 |
| 3 | Use roll A | 8 | 80 | 1.61 | 7.10 | 46.9 | 9.1 | 39.4 | 83.3 | 4 | 23.8 |
| 4 | Use roll B | 8 | 80 | 0.32 | 2.00 | 24.2 | 8.8 | 65.0 | 83.6 | 3 | 52.4 |
| 5 | Use roll A | 10 | 80 | 2.15 | 9.28 | 77.6 | 9.8 | 15.0 | 81.7 | 9 | 6.9 |
| 6 | Unused | 10 | 80 | 0.04 | 0.11 | 9.3 | 8.3 | 83.8 | 83.7 | 0 | — |
| 7 | — | — | 80 | 0.86 | 3.56 | 45.9 | 21.0 | 39.9 | 69.3 | 3 | — |
| 8 | — | — | 148 | 0.55 | 2.40 | 32.1 | 30.1 | 56.8 | 59.8 | 1 | — |
| 9 | — | — | 70 | 0.41 | 2.53 | 36.1 | 25.2 | 54.9 | 65.6 | 1 | — |
| 10 | — | — | 70 | 0.18 | 1.27 | 21.2 | 20.1 | 69.7 | 73.6 | 1 | — |
| 11 | — | — | 140 | 0.40 | 1.63 | 21.7 | 20.8 | 68.7 | 72.3 | 1 | — |
| 12 | — | — | 145 | 0.30 | 1.93 | 47.8 | 45.5 | 43.4 | 46.9 | 1 | — |
| 13 | — | — | 92 | 0.20 | 1.41 | 74.0 | 71.8 | 19.1 | 21.6 | 1 | — |

As shown in Table 1, the resin films of Examples 1 to 4 had the transmittance $T_1$ of from 20% to 70% and the transmittance $T_2$ of 75% or higher. On the other hand, the resin films of Examples 5 to 13 did not satisfy at least one of the conditions of the transmittance $T_1$ and the transmittance $T_2$.

Example 21

Tomato cultivation by a house was performed using the film with an anti dropping agent obtained in Example 1. Specifically, in an agricultural roof-type greenhouse with an eave height of 4 m, in which agricultural fluorine-resin film was expanded with an uneven surface (coated surface of the anti dropping agent) facing inside, tomatoes were cultivated by a cultivation method of long-term multi-stage harvesting using high wire induction. For the tomato cultivation, the plant was planted in August at the house and harvested from the beginning of November to the middle of June. The tomato variety was "Mylock" and the number of planted plants was 2,400 per 10 a. Table 2 shows the yield per 10 a of each month and the total yield (t) per 10 a in winter (January to February), summer (May to June), and the whole harvest period.

Examples 22 to 24

Except that the film with an anti dropping agent was changed as shown in Table 2, tomatoes were cultivated in the same manner as in Example 21. Table 2 shows the yield per 10 a of each month and the total yield (t) per 10 a in winter (January to February), summer (May to June), and the whole harvest period.

TABLE 2

| | Example | 21 | 22 | 23 | 24 |
|---|---|---|---|---|---|
| | Film with anti dropping agent | Example 1 | Example 6 | Example 5 | Example 8 |
| Yield [t] | November | 3.1 | 3.0 | 2.7 | 2.9 |
| | December | 2.2 | 2.3 | 2.0 | 2.3 |
| | January | 2.8 | 2.4 | 2.4 | 2.7 |
| | February | 2.3 | 1.9 | 2.2 | 2.1 |
| | March | 3.1 | 3.0 | 3.0 | 3.0 |
| | April | 5.0 | 3.8 | 4.0 | 4.1 |
| | March | 6.6 | 5.5 | 5.0 | 5.0 |
| | Beginning to middle of June | 4.1 | 3.1 | 3.2 | 3.5 |
| | Total of winter (January to February when temperature is low and solar altitude is low) | 21.0 | 22.0 | 23.0 | 24.0 |
| | Total of summer (May to June when the day is long and solar altitude is high) | 5.0 | 4.7 | 4.4 | 5.0 |
| | Total of whole period | 34.3 | 28.8 | 28.7 | 28.7 |

As shown in Table 2, in Example 21 using a film with an anti dropping agent having the transmittance $T_1$ of from 20% to 70% and the transmittance $T_2$ of 75% or higher, the total yield of tomatoes during the entire harvest period was higher than those in Examples 22 to 24, which did not satisfy at least one of these conditions. In addition, Example 21, the yields in winter (January to February) and summer (May to June) were higher than those in Examples 22 to 24. This is thought to be due to the fact that in Example 21, the light sufficiently reached near the ground in the house over the whole period to promote sufficiently the growth also in the lower part and it was prevented that the house became hot and humid and the tomato suffering from diseases such as canker disease. Also, this is thought to be due to the fact that, in the summer, the sunlight is sufficiently diffused to prevent leaf burning or bottom rot due to direct exposure to leaves and fruits of the tomato from occurring, and in winter, sufficient quantity of light was secured when condensation occurs on the uneven surface of the film.

In Example 22, it is thought that the yield was smaller than that in Example 21 due to the effect of leaf burning or bottom rot by direct sunlight.

In Example 23, it is thought that the yield was smaller than that in Example 21 due to the effect that it was difficult for light to reach near the ground in the house.

In Example 24, it is thought that the yield was smaller than that in Example 21 due to the effect of insufficient quantity of light in the house, especially in winter.

This application is a continuation application of International Application No. PCT/JP2018/034051, filed on Sep. 13, 2018, which claims the benefit of priority of the prior Japanese Patent Application No. 2017-185017, filed on Sep. 26, 2017, the entire contents of the specification, claims, drawings, and abstract of which are incorporated herein as disclosure of the specification of the present invention.

REFERENCE SIGNS LIST

1 Agricultural fluorine-resin film
1a Uneven surface
1b Surface opposite uneven surface
2 Test film
3 Water film
4 Laminate
100, 200, 300 Measuring apparatus
10 Box
12 Light source
13 Slit plate
13a Slit
14 Toroidal mirror
16 Integrating sphere
16a Entrance window
18 Sample folder
18a Opening
50 Light source
52 Light receiver

The invention claimed is:
1. A film comprising fluorine-resin,
wherein one surface of the film has unevenness and has an arithmetic average roughness Ra of from 0.30 to 1.26 μm,
the film has a transmittance $T_1$ of from 20% to 70% at a wavelength of from 300 to 800 nm and a transmittance

$T_2$ of 75% or more, where the transmittance $T_2$ is a transmittance of a laminate at a wavelength of from 300 to 800 nm, the laminate obtained by laminating the film and a test film such that a film of water is formed between the film and the test film and that the surface of the film having the unevenness is completely filled with the water, wherein the test film has a thickness of 50 μm, consists of an ethylene-tetrafluoroethylene copolymer, and has a transmittance at a wavelength of from 300 to 800 nm of 94% and an arithmetic average roughness Ra of both surfaces of 0.04 μm, and when light emitted from a light source is incident on the film, a transmittance of parallel rays in transmitted light with a diffusion angle of 2.5 degrees or less is from 15% to 55%.

2. The film according to claim 1, wherein the film has a haze value of from 15% to 60%.

3. The film according to claim 1, wherein the surface having the unevenness has a maximum height roughness Rz of from 1 to 8 μm.

4. The film according to claim 1, wherein the fluorine-resin is an ethylene-tetrafluoroethylene copolymer.

5. The film according to claim 1, further comprising: an ultraviolet absorber.

6. The film according to claim 1, wherein when light emitted from a light source is incident on an opposite surface of the film with respect to the surface having the unevenness at an incident angle of 0 degrees, a diffusion angle θ of transmitted light diffused at a light intensity corresponding to 10% of a light intensity of the transmitted light with a diffusion angle of 0 degrees is from 6 to 10 degrees.

7. The film according to claim 1, wherein when the light emitted from the light source is incident on the film, the transmittance of parallel rays in transmitted light with a diffusion angle of 2.5 degrees or less is from 23.8% to 52.4%.

8. The film according to claim 1, wherein the film has a thickness of from 25 to 130 μm.

9. A greenhouse, comprising the film according to claim 1.

10. The greenhouse according to claim 9, wherein the greenhouse has eaves, and an eaves height is 4 m or more.

11. The greenhouse according to claim 9, further comprising a glass window, wherein the film is expanded inside the glass window.

12. The film according to claim 1, wherein the unevenness is formed by embossing the surface of the film.

13. The film according to claim 1, wherein the film is obtained by extruding a resin comprising the fluorine-resin into a film shape and embossing one surface of the film to form the unevenness.

14. The film according to claim 1, wherein the surface of the film having the unevenness is coated with an anti-dropping agent.

15. The film according to claim 1, wherein when the light emitted from the light source is incident on the film, the transmittance of parallel rays in transmitted light with a diffusion angle of 2.5 degrees or less is from 20% to 55%.

16. The film according to claim 1, wherein the surface having the unevenness is coated with an anti-dropping agent comprising inorganic fine particles.

17. The film according to claim 1, wherein the fluorine-resin has a number average molecular weight of from 100,000 to 700,000.

18. The film according to claim 1, wherein the surface having the unevenness has a maximum height roughness Rz of from 4 to 7 μm.

* * * * *